Sept. 8, 1964  E. A. TAYLOR, JR  3,148,327

STROBOSCOPIC SPEED RATIO INDICATOR

Filed June 3, 1959

INVENTOR
*Ernest A. Taylor, Jr.*

BY *Roy P. Wymbs and Thomas M. Hammond*

ATTORNEYS

United States Patent Office 3,148,327
Patented Sept. 8, 1964

3,148,327
STROBOSCOPIC SPEED RATIO INDICATOR
Ernest A. Taylor, Jr., Decatur, Ala., assignor, by mesne assignments, to Monsanto Company, a corporation of Delaware
Filed June 3, 1959, Ser. No. 817,931
1 Claim. (Cl. 324—69)

The present invention relates to a speed ratio indicator, and particularly to an apparatus for continuously indicating the speed ratio between two rotating elements where it is desired to operate the rotating elements at a number of speed ratios by varying the speed of one or both of them.

The problem of obtaining the speed ratio between two rotating elements in a continuous and accurate manner has been met in the past by using such devices as gear change boxes with any of a variety of speed indicators, the gear change boxes limiting the number of available steps. In some cases, electronic counters have been employed, but these are generally quite expensive, and not warranted for many uses.

Broadly, the present invention utilizes a stroboscopic disc which is so marked as to continuously indicate the speed ratio between a rotating element by which the disc is driven, and a second rotating element which actuates a stroboscopic light to illuminate the disc at predetermined intervals.

It is an object of this invention to provide an apparatus for indicating the speed ratio between two rotating elements. It is further an object of this invention to provide such an apparatus which is both inexpensive and quite accurate. It is further an object of this invention to provide a device for indicating the speed ratio between two rotating elements which may be varied over a stepless speed range, to be used to set and manually maintain said speed ratio. A still further object of this invention is to provide an apparatus for continuously indicating the speed ratio between two rotating elements where it is desired to operate the rotating elements at a number of speed ratios by varying the speed of one or both of them. Other objects and many of the attendant advantages of this invention will be readily appreciated as the same becomes better understood by reference to the following detailed description and accompanying drawings.

Figure 1:
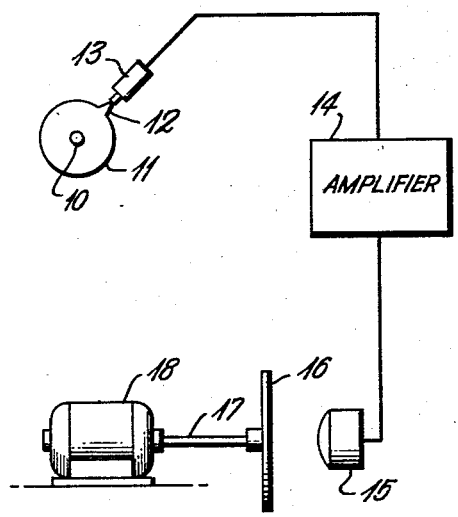
FIGURE 1 is a side elevational view showing the instant speed ratio indicator in schematic form.

In FIGURE 1 reference numeral 10 indicates a rotatable shaft upon which is mounted a cam 11 having a single point or lobe 12 extending therefrom. The point 12 actuates a magnetic pickup head 13 upon each revolution of the shaft. A signal transmitted from the pickup head 13 through an amplifier 14 and to a stroboscopic light 15 actuates the flashing light 15 thus illuminating a stroboscopic disc 16 which is mounted on a rotatable shaft 17 connected to a motor 18.

Figure 2:
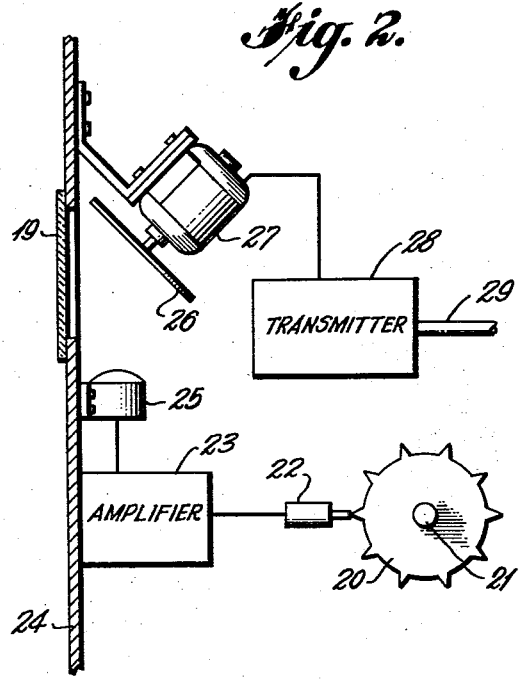
FIGURE 2 is a side elevational view of a second embodiment of the invention shown in schematic form.

In FIGURE 2 of the drawing a slightly different embodiment of the apparatus is shown mounted on a panel 24. In this case a ten pointed cam 20 mounted on a rotatable shaft 21 actuates a magnetic pickup head 22 ten times for every revolution of the shaft. The impulses from the magnetic pickup head 22 are passed to an amplifier 23 and thus to a stroboscopic light 25. A stroboscopic disc 26 is shown mounted on a selsyn motor 27 which is connected to a selsyn transmitter 28 driven by a shaft 29 connected to driving means (not shown). A window 19 is provided in the front of the panel 24 for viewing the stroboscopic disc.

Figure 3:
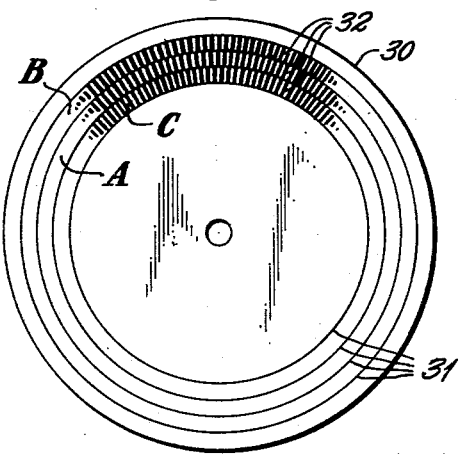
FIGURE 3 is a front elevational view of one form of stroboscopic disc which may be employed in the invention.

The stroboscopic disc of this invention illustrated in FIGURE 3 shows a disc 30 with a series of concentric circles 31 on the face thereof. Each adjacent pair of concentric circles defines an area which is divided into a number of equal divisions 32. The number of divisions in each area so defined will depend upon the speed ratio of the shafts 10 and 17 which it is desired to be indicated. In general, the speed of the shaft on which the stroboscopic disc is mounted is taken as the reference speed. The speed of the shaft driving the cam is expressed as a percent of the speed of the shaft driving the disc. In the embodiment of FIGURE 3 the disc illustrated is intended to be driven by the slower moving shaft 17 of FIGURE 1 with a given speed of, for example, 100 r.p.m. For a rotational speed of 150 r.p.m. on the faster moving shaft 10, 150 divisions are provided in circular area A. The number of divisions in circular area B is 151, while the number of divisions in circular area C is 149. Thus, the number of divisions is equal to the high speed expressed as a percentage of the low speed.

Employing the disc of FIGURE 3 in the system disclosed in FIGURE 1, the operation of the system will now be described. The disc 16 mounted on the slow speed shaft 17 revolves at a set speed of 100 r.p.m. The stroboscopic light 15 is actuated 150 times per minute by the revolving shaft 10 rotating at 150 r.p.m. At the above indicated speeds, the circular area A containing 150 divisions on the disc would appear to be stationary. Generally, the circular areas with more divisions will appear to rotate in a direction opposite to the circular areas with fewer divisions. In the particular case under consideration, circular area B containing 151 divisions and those circular areas peripheral thereto would appear to rotate in the opposite directions from the actual rotation of the disc. Circular area C containing 149 divisions and those circular areas beneath it with a progressively smaller number of divisions would appear to rotate in the same direction as the actual rotation of the disc. If the speed ratio of shaft 10 to shaft 17 is 149 percent, then circular area C containing 149 sub-divisions would appear to be stationary. Thus it is seen that a continuous and accurate indication of the speed ratio of the two rotating elements is provided. Where the speed ratio falls at an intermediate point, such as 150.5 percent, then circular areas A and B would appear to rotate at equal speeds in opposite directions.

It is obvious that the number of circles on the disc may be varied over a wide range depending on the size of the disc and the width of the area defined by any pair of adjacent concentric circles. When the range of speed ratios to be determined is too great to be indicated on a single disc, then additional discs with progressively greater and smaller numbers of divisions may be employed. Thus, for example, one disc may contain twenty circular areas with the number of divisions in each circular area ranging from 135 to 154 to indicate speed ratios of 135 percent to 154 percent. A disc containing twenty circular areas with the number of divisions ranging from 155 to 174 can be substituted when the speed ratio exceeds 154 percent. A disc containing twenty circular areas with the number of divisions ranging from 115 to 134 can be substituted when the speed ratio falls below 135 percent. By the use of many discs, wide speed ratio ranges can be indicated.

If desired, a stationary marker strip (not shown) numerically indicating the ratio of each circular area of the stroboscopic disc may be disposed in front of the stroboscopic disc to enable a direct reading of the ratio indicated by any particular circular area. The marker strip is disposed in such a manner that the numerals thereon indicating the ratios represented by the circular areas are disposed over each circular area so represented. The marker strip can be of any convenient material and can have any convenient shape so long as the numerals are disposed properly over the circular areas represented and the strip is located in such a manner as to facilitate direct reading.

When the rotating elements are moving at very slow speeds, the apparent rotation of the circular areas above and below the stationary circular area can be increased by using increased numbers of points to flash the stroboscopic light. As shown in FIGURE 2, this is accomplished by providing cam 20 on shaft 21 with 10 points so that the light will flash 10 times for each r.p.m. of the shaft, causing the areas defined by adjacent concentric circles on the disc to appear to rotate 10 times as fast. If it is desired to further increase the apparent speed of the circular areas, this may be done by providing a greater number of points on the rotating cam. For example, a 100 point cam could be employed to increase the apparent speed 100 times over the apparent speed using a single point cam. The employment of a multipoint cam is further advantageous in that the ratios indicated on the stroboscopic discs may be divided into ratios between integers. The employment of a 10 point cam, for example, will permit the indication of ratios to .1 of 1 percent. This work requires increasing the divisions of the circular areas divided by adjacent concentric circles on the stroboscopic disc. As an example, to indicate 150.1 percent would require 1501 divisions in a circular area appearing on the face of the stroboscopic disc.

In the present system, it is, of course, unnecessary to mount the stroboscopic disc directly on the shaft. As shown in FIGURE 2 the disc is mounted on a shaft driven by a selsyn motor which connects to a selsyn transmitter driven from a low speed shaft. It is obvious that other drive means could be provided for synchronizing the speed of rotation of the stroboscopic disc with the driving shaft.

Figure 4:
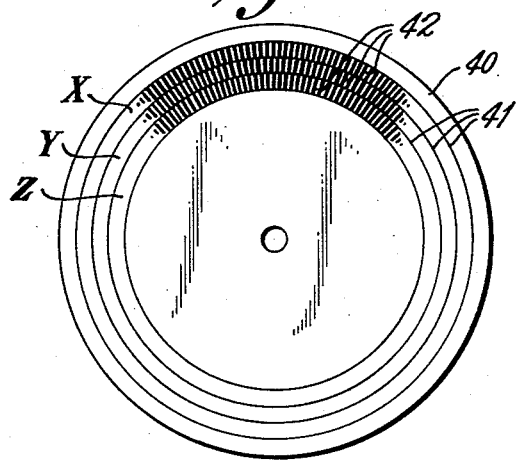
FIGURE 4 is a front elevational view of another embodiment of stroboscopic disc which may be employed.

In the embodiment discussed above the speed of the faster rotating element has been expressed as a function of the speed of the slower moving element. However, this procedure can be reversed by driving the timer cam from the low speed shaft and the stroboscopic disc from the high speed shaft. Turning to FIGURE 4 we see a disc particularly adapted to this modification. In the embodiment there disclosed, disc 40 contains concentric circles 41 defining circular areas divided into divisions 42. For purposes of illustration, three adjacent circular areas X, Y, and Z are shown divided into 24, 25, and 26 divisions successively. For a speed ratio of 4 to 1, the low speed shaft rotates at 25 percent of the speed of the high speed shaft. At these conditions, with the stroboscopic disc driven by the high speed shaft, the circular area Y containing 25 sub-divisions will appear to be stationary. If by a change in the speed of either shaft, the ratio changes to 24 or 26 percent, this will be indicated by the change in the stroboscopic pattern on the disc. That is to say circular areas X or Z will appear to be stationary.

It is, of course, apparent that the discs illustrated in FIGURES 3 and 4 of the drawings are merely by way of example. The number of concentric circular areas as well as the number of divisions in each circular area may each be varied so as to express best any particular speed ratio which it is desired to employ. Whatever number of circular areas defined by adjacent concentric circles and number of divisions used, the number of divisions in each circular area will vary progressively from the number of divisions in the adjacent circular area by any predetermined amount.

It will be recognized that the stroboscopic effect of non-movement of one circular area will appear not only when the number of divisions in that circular area represents the speed ratio of the rotating elements, but also any even multiple or fraction of that speed ratio. Thus, if the speed ratio between the high speed shaft and the low speed shaft is 300 percent and the disc of FIGURE 3 is employed, the circular area A with 150 divisions would appear to be stationary. Such wide variations in speed, however, are easily detected by the apparent speed of the rotating disc or by standard rough measurements. Furthermore, the apparent rotation of circular areas B and C would be twice as fast as they would appear at 150 r.p.m.

It should be understood, of course, that the foregoing disclosure relates to only preferred embodiments of the invention and that it is intended to cover all changes and modifications of the examples of the invention herein chosen for the purposes of the disclosure, which do not constitute a departure from the spirit and scope of the invention as set forth in the appended claim.

What is claimed is:

An apparatus for indicating the speed ratio of a pair of shafts, comprising a cam mounted on one of the shafts, a stroboscopic lamp, means connected to the stroboscopic lamp and actuated by the cam for operating said lamp, said cam having thereon a plurality of lobes for actuating the lamp a plurality of times during a single revolution of said one shaft, a selsyn generator connected to the other shaft, a selsyn motor connected to the selsyn generator and positioned adjacent to the stroboscopic lamp, a disc connected to and driven by the selsyn motor, said disc having thereon a plurality of concentric ringlike areas each of which is divided into a predetermined number of divisions, said number of divisions in each area varying from the number of divisions in adjacent areas by a predetermined amount, said disc also being positioned adjacent to the lamp.

References Cited in the file of this patent

UNITED STATES PATENTS

| | | |
|---|---|---|
| 1,918,908 | Heronimos | July 18, 1933 |
| 2,070,623 | Satterlee | Feb. 16, 1937 |
| 2,370,176 | Kornei | Feb. 27, 1945 |
| 2,430,125 | Kipnis | Nov. 4, 1947 |

OTHER REFERENCES

Frequency Monitor Stroboscope by Wallace S. Wiggins, Electronics, May 1945, pages 138 and 139.